(12) United States Patent
Yoo et al.

(10) Patent No.: US 11,899,334 B2
(45) Date of Patent: Feb. 13, 2024

(54) SILICON PHOTONICS-BASED OPTICAL MODULATOR

(71) Applicant: ELECTRONICS AND TELECOMMUNICATIONS RESEARCH INSTITUTE, Daejeon (KR)

(72) Inventors: Sanghwa Yoo, Daejeon (KR); Sooyeon Kim, Daejeon (KR); Heuk Park, Daejeon (KR); Jyung Chan Lee, Daejeon (KR); Joon Ki Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 74 days.

(21) Appl. No.: 17/545,063

(22) Filed: Dec. 8, 2021

(65) Prior Publication Data

US 2023/0068004 A1 Mar. 2, 2023

(30) Foreign Application Priority Data

Aug. 25, 2021 (KR) .................. 10-2021-0112543

(51) Int. Cl.
*G02F 1/225* (2006.01)
*G02F 1/01* (2006.01)

(52) U.S. Cl.
CPC .......... *G02F 1/2257* (2013.01); *G02F 1/0123* (2013.01); *G02F 2202/105* (2013.01)

(58) Field of Classification Search
CPC . G02F 1/2257; G02F 1/0123; G02F 2202/105
See application file for complete search history.

(56) References Cited

U.S. PATENT DOCUMENTS

| | | | | |
|---|---|---|---|---|
| 6,711,312 B1 * | 3/2004 | Kornrumpf | ............. | G02F 1/065 385/2 |
| 6,818,466 B2 * | 11/2004 | Kornrumpf | ............. | G02F 1/225 438/31 |

(Continued)

FOREIGN PATENT DOCUMENTS

| | | | | |
|---|---|---|---|---|
| EP | | 3405822 B1 * | 10/2020 | ........... G02F 1/0121 |
| JP | | 2018-105975 A | 7/2018 | |
| KR | 10-2005-0086926 A | | 8/2005 | |

OTHER PUBLICATIONS

Qi et al. (2016). 2016 Qi Nan Co-Design and Demonstration of a 25Gbps Silicon-Photonic Mach Zehnder Modulator with a CMOS Based High Swing Driver IEEE Selected Topics in Quantum Electronics vol. 22 No. 6 3400410. (Year: 2016).*

(Continued)

*Primary Examiner* — Peter Radkowski
(74) *Attorney, Agent, or Firm* — LRK PATENT LAW FIRM

(57) ABSTRACT

A silicon photonics-based optical modulator is disclosed. The optical modulator includes first radio frequency (RF) metal electrodes that operate as a ground, phase shifters disposed between the first RF metal electrodes for optically modulating an optical signal transmitted along an optical waveguide, second RF metal electrodes disposed between the phase shifters for providing an RF electrical signal received from a driving driver located outside of the optical modulator through one end, resistor-inductors (RL) connected to another end of the second RF metal electrodes, an inductive line disposed between the RLs and a power supply for applying a bias voltage to the optical modulator and the driving driver, and a silicon capacitor disposed between the RLs and the power supply for preventing a degradation of an RF response characteristic of the silicon photonics-based optical modulator caused by the inductive line.

20 Claims, 7 Drawing Sheets

(56) References Cited

U.S. PATENT DOCUMENTS

| | | | | |
|---|---|---|---|---|
| 7,383,034 | B2* | 6/2008 | Shima | H03D 7/1458 455/333 |
| 9,454,059 | B1 | 9/2016 | Nagarajan | |
| 10,082,718 | B2* | 9/2018 | Schmogrow | G02F 1/0123 |
| 10,831,044 | B1 | 11/2020 | Doerr | |
| 10,892,831 | B2 | 1/2021 | Watanabe | |
| 10,914,968 | B2* | 2/2021 | Goodwill | G02F 1/0121 |
| 10,996,537 | B2* | 5/2021 | Davies | G02F 1/0123 |
| 11,269,200 | B2* | 3/2022 | Goodwill | G02F 1/0147 |
| 11,513,299 | B2* | 11/2022 | Shields | H04L 9/0852 |
| 2002/0071622 | A1 | 6/2002 | Betts et al. | |
| 2004/0120626 | A1* | 6/2004 | Kornrumpf | G02F 1/065 385/2 |
| 2005/0266822 | A1* | 12/2005 | Shima | H03D 7/1433 455/323 |
| 2017/0357061 | A1* | 12/2017 | Shields | G02B 6/4203 |
| 2018/0173077 | A1* | 6/2018 | Schmogrow | G02F 1/2255 |
| 2018/0180965 | A1* | 6/2018 | Goi | G02F 1/2255 |
| 2020/0201135 | A1* | 6/2020 | Davies | G02B 6/2935 |
| 2020/0386941 | A1 | 12/2020 | Kang et al. | |
| 2021/0072614 | A1 | 3/2021 | Yoo et al. | |

OTHER PUBLICATIONS

Jeewandara, Thamarasee, Hybrid multi-chip assembly of optical communication engines via 3-Dnanolithography (May 14, 2020) retrieved Jun. 29, 2023 from https://phys.org/news/2020-05-hybrid-multi-chip-optical-d-nanolithography.html (Year: 2020).*

Allcock et al. Heating rate and electrode charging measurements in a scalable, microfabricated, surface-electrode ion trap. Appl. Phys. B 107, 913-919 (2012). https://doi.org/10.1007/s00340-011-4788-5 (Year: 2012).*

Sandia National Laboratories, Heterogeneous Integration of Silicon Electronics and Compound Semiconductor Optoelectronics for Miniature RF Photonic Transceivers, SAND2020-10083C, 2020 (Year: 2020).*

Meister et al., Matching p-i-n-junctions and optical modes enables fast and ultra-small silicon modulators, Opt. Express 21, 16210-16221 (2013) (Year: 2013).*

Bitar et al., Multi-pole multi-zero frequency-independent phase-shifter. Rev Sci Instrum Nov. 1, 2012; 83 (11): 114703. https://doi.org/10.1063/1.4767240 (Year: 2012).*

Banzhaf et al., Post-trench processing of silicon deep trench capacitors for power electronic applications, 2016 28th International Symposium on Power Semiconductor Devices and ICs (ISPSD), Prague, Czech Republic, 2016, pp. 399-402, doi: 10.1109/ISPSD.2016.7520862. (Year: 2016).*

Nathan C. Abrams, et al., "Silicon Photonic 2.5D Multi-Chip Module Transceiver for High-Performance Data Centers", IEEE Journal of Lightwave Technology, Jul. 2020.

\* cited by examiner

SILICON PHOTONICS-BASED OPTICAL MODULATOR

CROSS-REFERENCE TO RELATED APPLICATION

This application claims the benefit of Korean Patent Application No. 10-2021-0112543 filed on Aug. 25, 2021, in the Korean Intellectual Property Office, the entire disclosure of which is incorporated herein by reference for all purposes.

BACKGROUND

1. Field of the Invention

One or more example embodiments relate to a silicon photonics-based optical modulator, and more particularly, to a structure that avoids inhibiting a radio frequency (RF) response characteristic while supplying a bias voltage to a metal electrode forming the optical modulator.

2. Description of Related Art

Silicon photonics technology is a technology for integrating a photonics device into a single chip through a commercial complementary metal-oxide-semiconductor (CMOS) process. Through such technology, it is possible to lower costs by mass producing optical communication devices, perform downsizing by two-dimensional (2D) or three-dimensional (3D) integration, and provide high capacity by repeatedly arranging devices. A silicon photonics-based optical modulator is being considered as a core functional device for resolving data center traffic and telecom traffic which are exponentially increasing.

For example, a silicon photonics-based optical modulator may include a first radio frequency (RF) metal electrode connector connected to a driving driver that supplies an RF electrical signal and a second RF metal electrode connector that is supplied with a direct current (DC) voltage supply. An output of the driving driver may be input to an input edge of the first RF metal electrode connector to modulate an optical signal transmitted through silicon optical waveguides while RF metal electrodes are propagated.

Here, the second RF metal electrode connector located near an edge of a termination end of the RF metal electrodes may be connected to each resistor-inductor (RL). Such RLs may be connected to a DC power supply, and thus the driving driver of the silicon photonics-based optical modulator may be operated.

In addition, a third RF metal electrode connector disposed on a location of RF metal electrodes may be directly connected to the DC power supply such that a bias voltage may be applied to a phase shifter of the silicon photonics-based optical modulator.

While the DC power supply may be needed to operate a silicon photonics-based optical modulator and a driving driver, a connection with RF-designed metal electrodes may inhibit an overall RF response characteristic of the optical modulator.

SUMMARY

Example embodiments provide a structure wherein a silicon capacitor is arranged between a resistor-inductor (RL) forming an optical modulator or an RF metal electrode to be connected directly when the RL is absent, and a power supply is located outside of the optical modulator while supplying a bias voltage to the RF metal electrode, which prevents the structure from inhibiting an overall radio frequency (RF) response characteristic of the optical modulator.

According to an aspect, there is provided a silicon photonics-based optical modulator, the optical modulator including first radio frequency (RF) metal electrodes that operate as a ground, phase shifters disposed between the first RF metal electrodes for optically modulating an optical signal transmitted along an optical waveguide, second RF metal electrodes disposed between the phase shifters for providing an RF electrical signal received from a driving driver located outside of the optical modulator through one end, resistor-inductors (RL) connected to another end of the second RF metal electrodes, an inductive line disposed between the RLs and a power supply for applying a bias voltage to the optical modulator and the driving driver, and a silicon capacitor disposed between the RLs and the power supply for preventing a degradation of an RF response characteristic of the silicon photonics-based optical modulator caused by the inductive line.

The silicon capacitor may be disposed on a trench region formed on a substrate forming the optical modulator. A size of the trench region may be determined based on a size of the silicon capacitor.

For the trench region, a depth may be determined such that a height of RF metal electrodes formed on a substrate forming the optical modulator corresponds to a height of a pad of the silicon capacitor.

The silicon capacitor that is separately manufactured may be connected to a substrate forming the optical modulator through a wire bonding or a bump bonding.

The silicon capacitor may be connected to a substrate forming the optical modulator after being disposed on a separate submount.

The silicon capacitor may be integrated into a single chip having undergone a same complementary metal-oxide-semiconductor (CMOS) process as the optical modulator.

The optical modulator may further include additional inductive lines disposed between one end of the first RF metal electrodes and bias power supplies when the first RF metal electrodes do not operate as the ground and a separate bias voltage is applied to each of the phase shifters, and a silicon capacitor disposed between the first RF metal electrodes and the bias power supplies for preventing a degradation of an RF response characteristic caused by the additional inductive lines of the silicon photonics-based optical modulator.

According to another aspect, there is provided a silicon photonics-based optical modulator, the optical modulator including RF metal electrodes that operate as a ground, phase shifters disposed between the RF metal electrodes for optically modulating an optical signal transmitted along an optical waveguide, a bias metal electrode disposed between the phase shifters for receiving a first bias voltage from a bias power source located outside of the optical modulator through one end, RLs connected to another end of the RF metal electrodes, an inductive line disposed between the RLs and a power supply for applying a second bias voltage to the optical modulator and a driving driver, and a silicon capacitor disposed between the RLs and the power supply for preventing a degradation of an RF response characteristic of the silicon photonics-based optical modulator caused by the inductive line.

The silicon capacitor may be disposed on a trench region formed on a substrate forming the optical modulator. A size of the trench region may be determined based on a size of the silicon capacitor.

For the trench region, a depth may be determined such that a height of metal electrodes formed on a substrate forming the optical modulator corresponds to a height of a pad of the silicon capacitor.

The silicon capacitor that is separately manufactured may be connected to a substrate forming the optical modulator through a wire bonding or a bump bonding.

The silicon capacitor may be connected to a substrate forming the optical modulator after being disposed on a separate submount.

The silicon capacitor may be integrated into a single chip having undergone a same CMOS process as the optical modulator.

The phase shifters may be connected in series through the bias metal electrode and operate in a series-push-pull structure.

According to another aspect, there is provided a silicon photonics-based optical modulator, the optical modulator including RF metal electrodes for receiving an RF electrical signal from a driving driver located outside of the optical modulator, phase shifters disposed between the RF metal electrodes for optically modulating an optical signal transmitted along an optical waveguide, a bias metal electrode for supplying a bias voltage from a bias power source located outside of the optical modulator through one end, an RL connecting another end of the RF metal electrodes to each other, and a silicon capacitor disposed in front of the RF metal electrodes for performing alternating current (AC) coupling on the RF electrical signal received from the driving driver.

The silicon capacitor may be disposed on a trench region formed on a substrate forming the optical modulator. A size of the trench region may be determined based on a size of the silicon capacitor.

For the trench region, a depth may be determined such that a height of RF metal electrodes formed on a substrate forming the optical modulator corresponds to a height of a pad of the silicon capacitor.

The silicon capacitor that is separately manufactured may be connected to a substrate forming the optical modulator through a wire bonding or a bump bonding.

The silicon capacitor may be connected to a substrate forming the optical modulator after being disposed on a separate submount.

The silicon capacitor may be integrated into a single chip having undergone a same CMOS process as the optical modulator.

The phase shifters may be connected in series through the bias metal electrode and operate in a series-push-pull structure.

Additional aspects of example embodiments will be set forth in part in the description which follows and, in part, will be apparent from the description, or may be learned by practice of the disclosure.

According to example embodiments, it is possible to avoid inhibiting an overall RF frequency response characteristic of an optical modulator by arranging a silicon capacitor between an RL forming the optical modulator or an RF metal electrode to be connected directly when the RL is absent and a power supply located outside of the optical modulator while supplying a bias voltage to the RF metal electrode.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
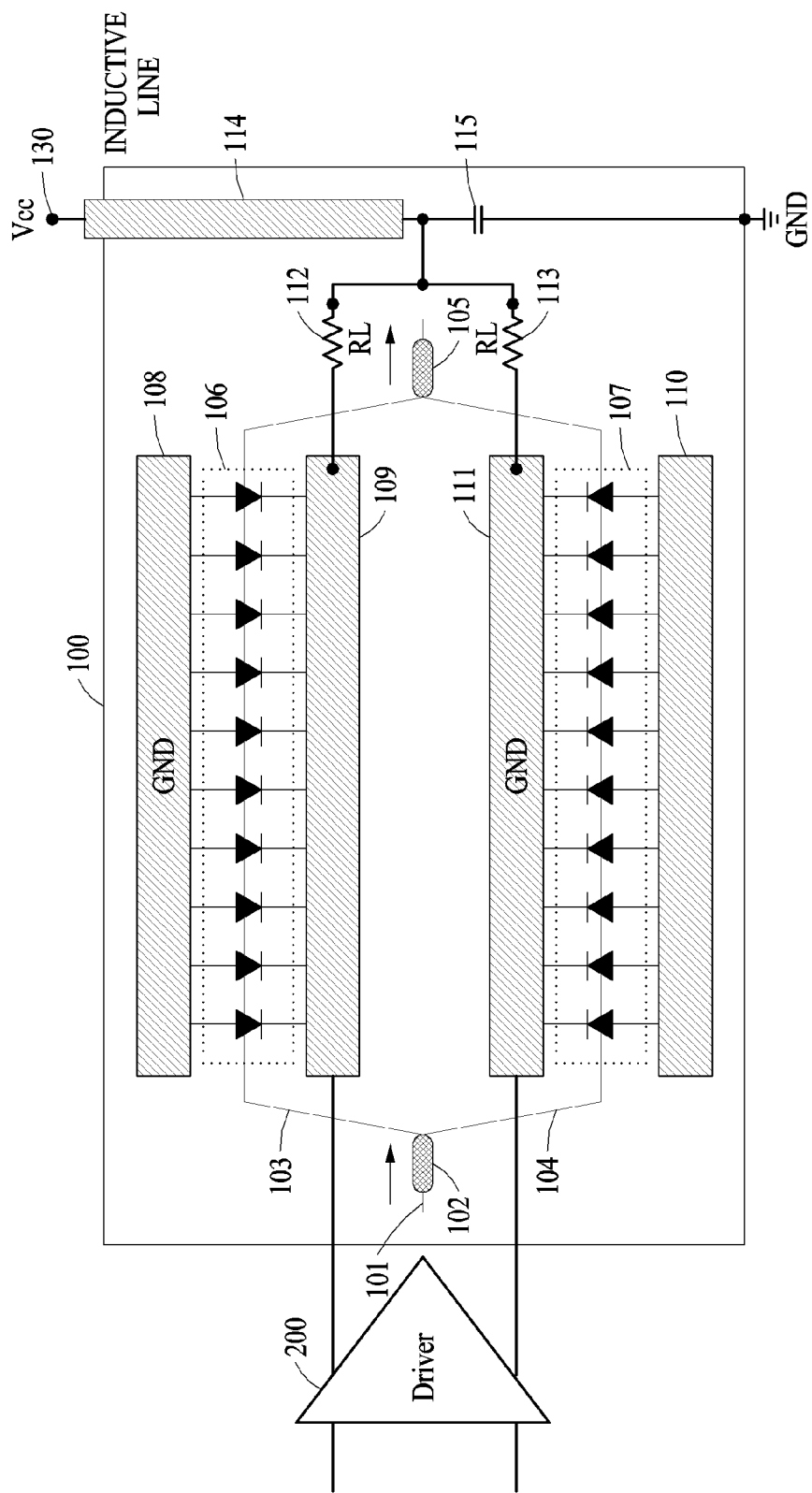
FIG. 1 is a diagram illustrating an example of a silicon photonics-based optical modulator according to an example embodiment.

FIG. 1 is a diagram illustrating an example of a silicon photonics-based optical modulator according to an example embodiment.

Referring to FIG. 1, an optical signal input to an optical waveguide 101 may be separated into different optical waveguides 103 and 104 through an optical distributor 102 in a silicon photonics-based optical modulator 100, hereinafter simply referred to as an optical modulator 100. The optical modulator 100 may include a first phase shifter 106 and a second phase shifter 107 disposed along the optical waveguides 103 and 104. The first phase shifter 106 and the second phase shifter 107 may include a plurality of PN diodes connected in parallel.

In addition, a radio frequency (RF) metal electrode 108 that operates as a ground with the first phase shifter 106 interposed therebetween and an RF metal electrode 109 that provides an RF electrical signal received from a driving driver 200 to the first phase shifter 106 may be disposed, and an RF metal electrode 110 that operates as a ground with the second phase shifter 107 interposed therebetween and an RF metal electrode 111 that provides an RF electrical signal received from the driving driver 200 to the second phase shifter 107 may be disposed.

Among outputs of the driving driver 200, an RF electrical signal (or "signal") and an RF electrical signal (or "inverse signal") may be input near a left edge of the RF metal electrode 109 and the RF metal electrode 111, respectively. Here, a propagation speed of an RF electrical signal propagating the RF metal electrode 109 and the RF metal electrode 111 and an optical signal propagating the optical waveguide 103 and the optical waveguide 104 may correspond to each other, which is known as a traveling wave optical modulator technology.

A resistor-inductor (RL) 112 and an RL 113 may be connected to a near right edge of the RF metal electrode 109 and the RF metal electrode 111, respectively. Each optical signal that propagates along the optical waveguide 103 and the optical waveguide 104 may be modulated by the first phase shifter 106 and the second phase shifter 107, respectively, and optically coupled through an optical coupler 105.

A power supply $V_{cc}$ 130 may be connected to provide a direct current (DC) voltage at a lower end of the RL 112 and the RL 113 for operating the driving driver 200 located outside of the optical modulator 100. Here, RF metal electrodes 108 through 111 may have an RF design, yet an inductive line 114 disposed between RLs 112 and 113 and the power supply 130 may not have the RF design.

The inductive line 114 may include (1) a metal wire formed on an optical modulator chip in which the optical modulator 100 is implemented, (2) a metal interface (e.g., a wire bond, a solder bump, etc.) between the optical modulator chip and an external printed circuit board (PCB), and (3) a metal wire formed on the external PCB. Here, the external PCB is merely provided as an example, and a separate submount substrate or a semiconductor chip may be provided as the external PCB.

An inductance of the inductive line 114 may degrade an RF response characteristic of the optical modulator 100. A typically used wire bond metal wire may have an inductance of 0.5-1.0 nanohenry per millimeter (nH/mm).

To resolve such issue, a small capacitor 115 may be disposed between the RL 112 or the RL 113 of the optical modulator 100 and the power supply 130. The small capacitor may be (1) implemented on an optical modulator chip in which the optical modulator 100 is implemented, or (2) separately manufactured from the optical modulator chip to be connected through a wire bond or a solder bump, or (3) connected to a separate submount substrate semiconductor chip including a capacitor.

Due to such a structure, an inhibition of an RF characteristic of the silicon photonics-based optical modulator 100 may be avoided even when the inductive line 114 is present between the optical modulator 100 and the power supply 130, and thus a DC voltage supply needed for the optical modulator 100 and the driving driver 200 may be provided.

Figure 2A:
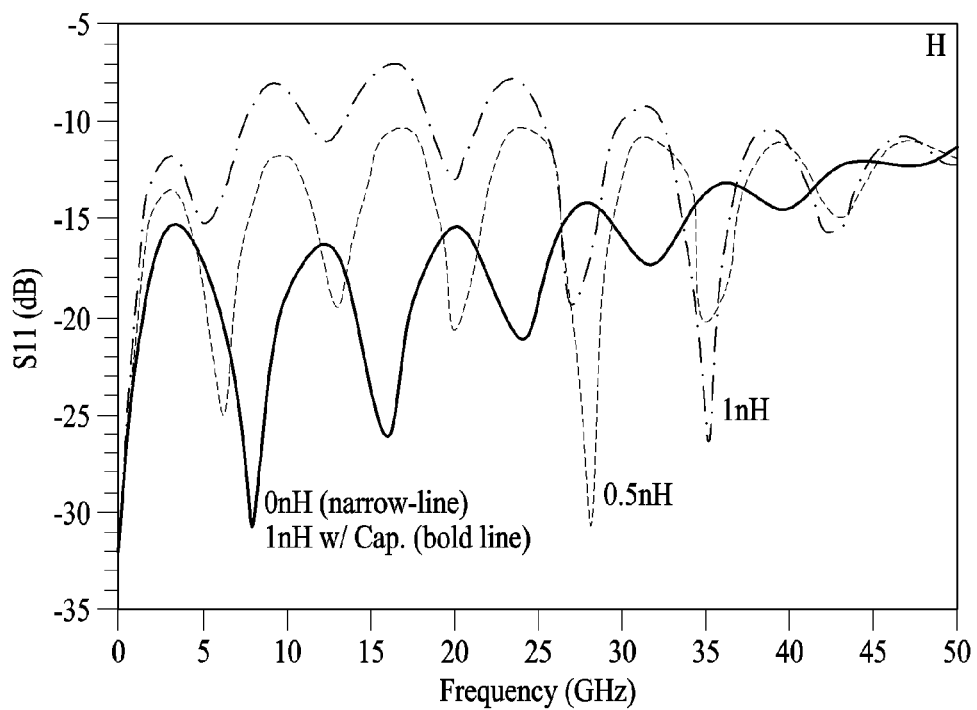
FIGS. 2A and 2B are diagrams illustrating examples of a result of simulating a scattering coefficient of the silicon photonics-based optical modulator according to example embodiments.
Figure 2B:
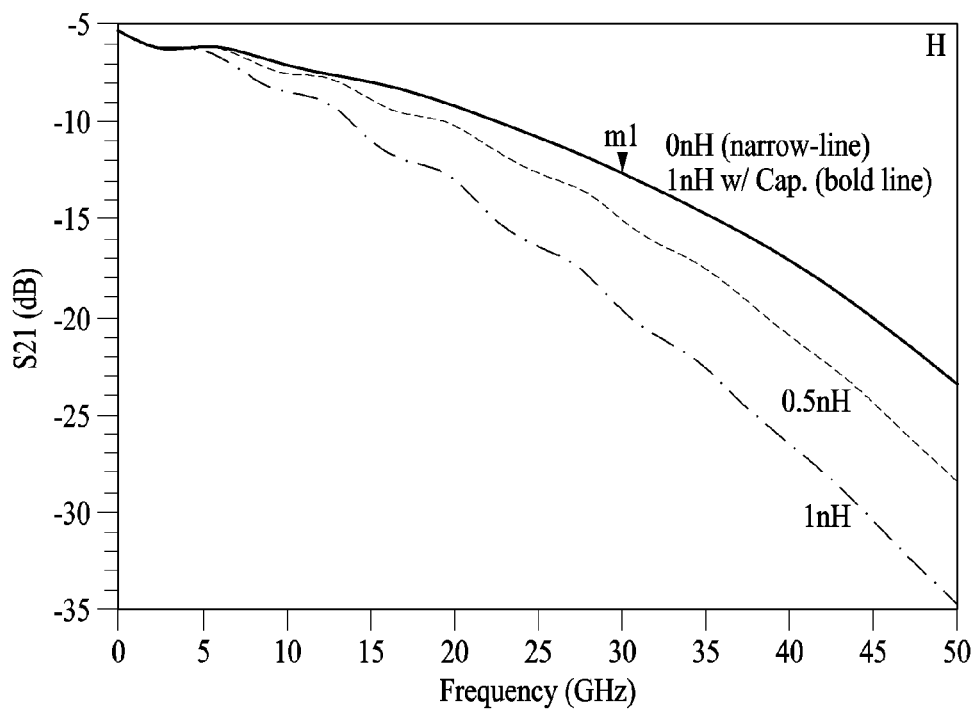

FIGS. 2A and 2B are diagrams illustrating examples of a result of simulating a scattering coefficient of the silicon photonics-based optical modulator according to example embodiments.

FIG. 2A illustrates an S11 simulation result of the optical modulator 100 based on an inductance value of the inductive line 114. FIG. 2B illustrates an S21 simulation result of the optical modulator 100 based on an inductance value of the inductive line 114. Referring to FIGS. 2A and 2B, an RF electrical signal reflection characteristic may be degraded as the inductance value of the inductive line 114 increases from 0 nH to 0.5 nH and 1 nH.

Typically, S11 may have a value less than −0 dB (S11<−10 dB). An RF electrical signal attenuation characteristic may be degraded as the inductance increases. A loss value of −6.2 dB may occur with 1 nH at a frequency of 30 gigahertz (GHz) (e.g., a part indicated as m1), and a loss value may greatly increase to −8.3 dB with 0.5 nH and −12.1 dB with 1 nH. That is, as the power supply 130 is connected to the optical modulator 100 through the inductive line 114, an overall frequency characteristic may be severely degraded.

To resolve such issue, the small capacitor 115 may be disposed between the RL 112 or RL 113 of the optical modulator 100 and the power supply 130. Referring to FIGS. 2A and 2B, the optical modulator 100 may be verified to have the same S11 and S21 frequency response characteristic as in a case in which the optical modulator 100 includes the small capacitor 115, as illustrated by a bold line, and in a case in which the optical modulator 100 does not include an inductive line, as illustrated by a thin (narrow) line.

Figure 3:
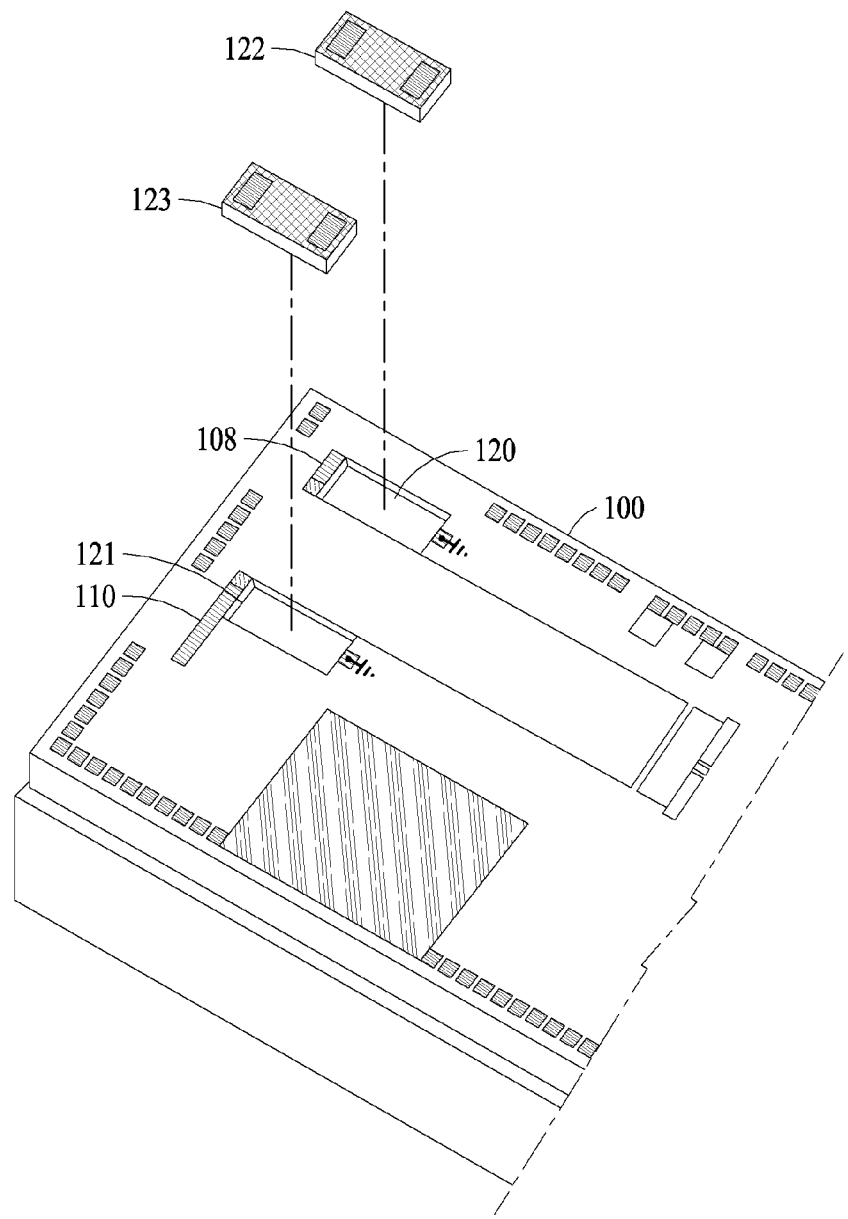
FIG. 3 is a diagram illustrating an example of a structure in which a small capacitor is disposed in a silicon photonics-based optical modulator according to an example embodiment.

FIG. 3 is a diagram illustrating an example of a structure in which a small capacitor is disposed in a silicon photonics-based optical modulator according to an example embodiment.

Referring to FIG. 3, a structure having another bias voltage needed for operating the optical modulator 100 being applied to the RF metal electrode 108 and the RF metal electrode 110 may be provided, in addition to a structure in which the small capacitor 115 is connected between the RL 112 and the RL 113 and the power supply 130 of the optical modulator 100.

The optical modulator 100 may need to be adjusted by applying a bias voltage to the first phase shifter 106 and the second phase shifter 107 for an optimal modulation performance. As illustrated in FIG. 3, a bias power supply $V_{b1}$ 131 and a bias power supply $V_{b2}$ 132 may be connected to the RF metal electrode 108 and the RF metal electrode 110, respectively, and a DC voltage may be applied to the RF metal electrode 108 or the RF metal electrode 110.

A voltage across both ends of a PN diode of the first phase shifter 106 may be represented as $V_{b1}-(V_{cc}-I_{dc1}\times RL)$, and a voltage across both ends of a PN diode of the second phase shifter 107 may be represented as $V_{b2}-(V_{cc}-I_{dc2}\times RL)$. Here, RL denotes a value of an RL of the optical modulator 100, $V_{b1}$ and $V_{b2}$ denote output values of the bias power supply 131 and the bias power supply 132, and $I_{dc1}$ and $I_{dc2}$ denote DC values in which a DC flows through the RF metal electrode 108 and the RF metal electrode 110 forming the optical modulator 100.

Typically, the first phase shifter 106 and the second phase shifter 107 may satisfy a relationship $V_{b1,b2}<(V_{cc}-I_{dc1,dc2}\times RL)$ due to a reverse voltage. For reference, when the RF metal electrode 108 and the RF metal electrode 110 are connected to the ground, a DC voltage $V_{cc}-I_{dc1,dc2}\times RL$ may be applied to the first phase shifter 106 and the second phase shifter 107, as illustrated in FIG. 1.

The RF metal electrode 108 and the RF metal electrode 110 of the optical modulator 100 may be connected to the bias power 131 and the bias power 132, respectively, through an inductive line 116 and an inductive line 118. Since the inductive line 116 and the inductive line 118 are metal wires, they may inhibit an RF response characteristic of the optical modulator 100, as illustrated in FIG. 1.

To resolve such issue, a small capacitor 117 may be inserted between the RF metal electrode 108 and the bias power source 131, and a small capacitor 119 may be inserted between the RF metal electrode 110 and the bias power source 132, and thus degradation of an RF response characteristic of the optical modulator 100 may be prevented.

Figure 4:
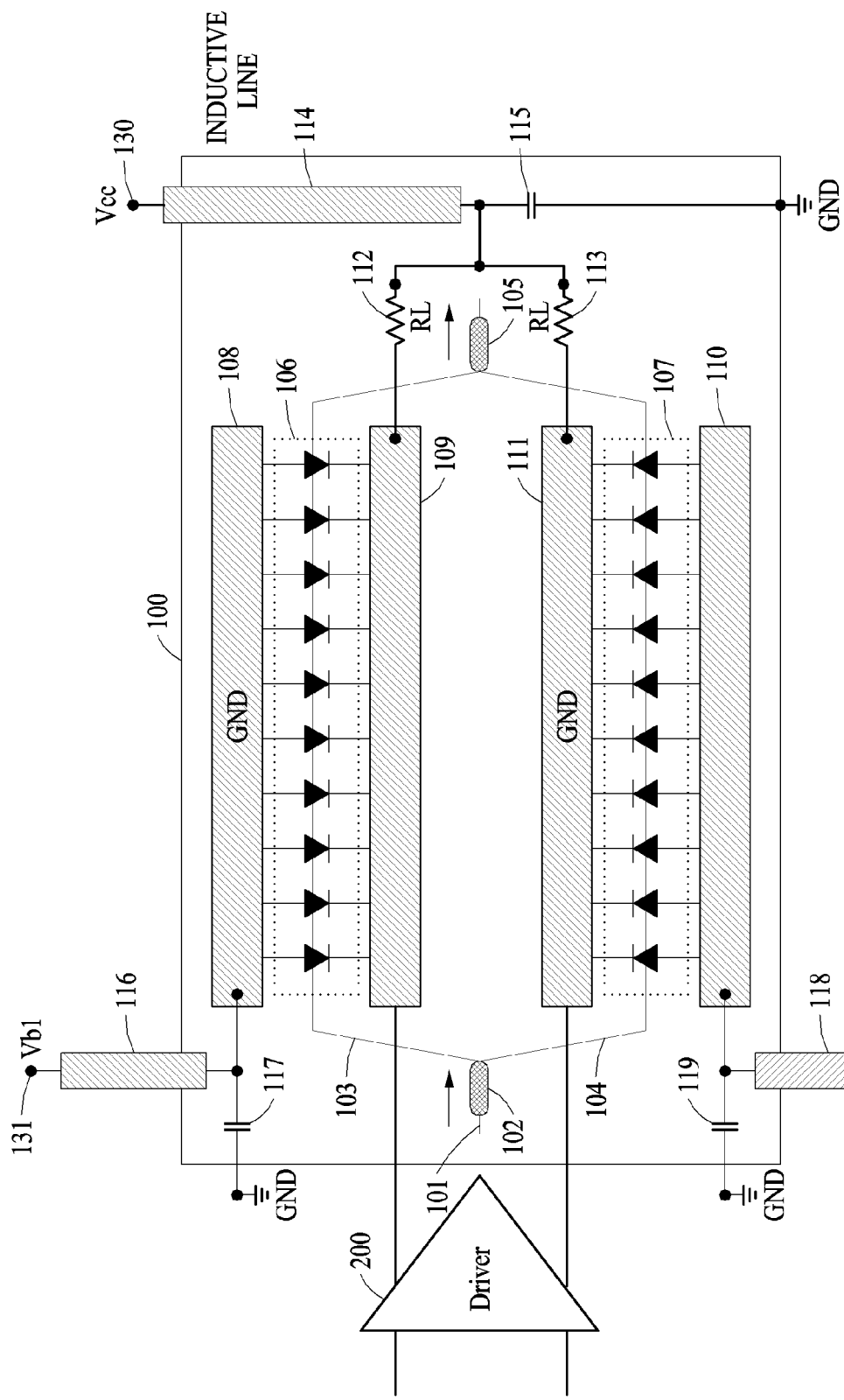
FIG. 4 is a diagram illustrating an example of a silicon photonics-based optical modulator according to an example embodiment.

FIG. 4 is a diagram illustrating an example of a silicon photonics-based optical modulator according to an example embodiment.

A small capacitor connected to the optical modulator 100 described herein may be a separately manufactured silicon capacitor 117 or silicon capacitor 119 illustrated in FIG. 4. Here, the number of silicon capacitors (e.g., the silicon capacitor 117 or the silicon capacitor 119) may not be limited to two silicon capacitors, and there may be one or a plurality of silicon capacitors. The silicon capacitor 117 or the silicon capacitor 119 may have a large capacitance while being extremely small in size. Example embodiments of the silicon capacitor 117 or the silicon capacitor 119 are described herein, and various types of compact-sized small capacitors with a potential to be implemented by or connected to a silicon photonics chip may be used.

Referring to FIG. 4, a silicon capacitor part 120 or a silicon capacitor part 121 may be formed on a substrate forming the optical modulator 100 such that a length×depth×height of the silicon capacitor 117 and the silicon capacitor 119 correspond, and thus the optical modulator 100 may reduce a difficulty in chip-to-chip packaging.

Since the present invention may be used as a technology for eliminating an inductance effect between the optical modulator 100 and the power supply 130, a length of an electrical connection line between the optical modulator 100 and the silicon capacitor 117 or the silicon capacitor 119 may need to be minimized.

For such minimization, a height of a pad of the RF metal electrode 108 and the RF metal electrode 110 and a height of a ground pad forming the optical modulator 100 may correspond to each other, and thus a length of an electrical connection line added for a connection may be minimized.

The silicon capacitor 117 or the silicon capacitor 119 may have a structure that is manufactured and connected separately as described above, and the optical modulator 100 and the silicon capacitor 117 or the silicon capacitor 119 may be manufactured at once through a complementary metal-oxide-semiconductor (CMOS) process.

Figure 5:
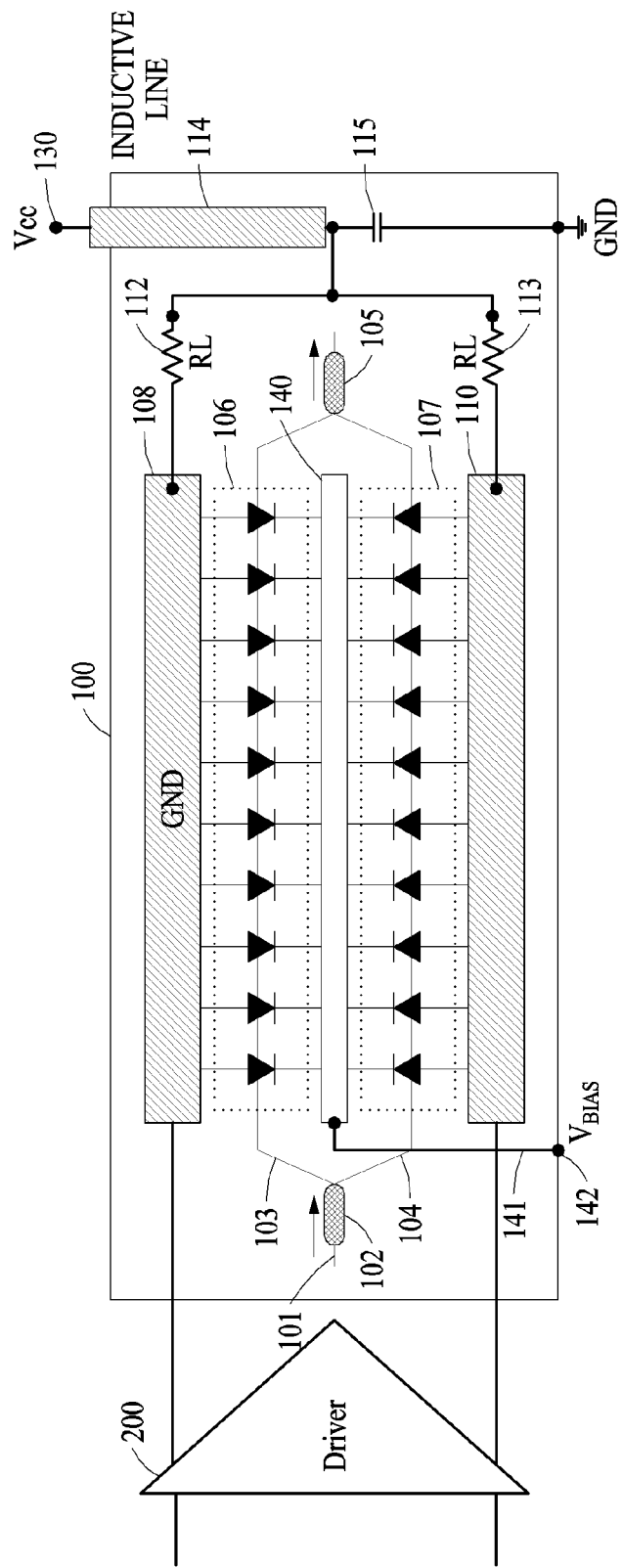
FIG. 5 is a diagram illustrating an example of a silicon photonics-based optical modulator according to an example embodiment.

FIG. 5 is a diagram illustrating an example of a silicon photonics-based optical modulator according to an example embodiment.

Referring to FIG. 5, the optical modulator 100 may be operated in a series-push-pull structure in which the first phase shifter 106 and the second phase shifter 107 are connected in series to each other. An RF electrical signal from the driving driver 200 may be input to the optical modulator 100, and the power supply 130 may be connected to a rear end of the RL 112 or the RL 113 for operating the optical modulator 100 and the driving driver 200.

Here, even when the inductive line 114 formed as a metal wire between the optical modulator 100 and the power supply 130 is present, a DC voltage needed for operating the optical modulator 100 and the driving driver 200 may be supplied without an RF response characteristic of the optical modulator 100 being inhibited, due to the connected small capacitor 115 described herein.

The optical modulator 100 that operates in a series-push-pull structure may have the DC voltage applied to a bias metal electrode 140 through the inductive line 141 connected to a bias power supply $V_{BIAS}$ 142. Here, the bias metal electrode 140 may be separate from the RF metal electrode 108 or the RF metal electrode 110. Thus, an overall RF response characteristic of the optical modulator 100 may not be affected even when the bias metal electrode 140 is inductive or resistive.

Figure 6:
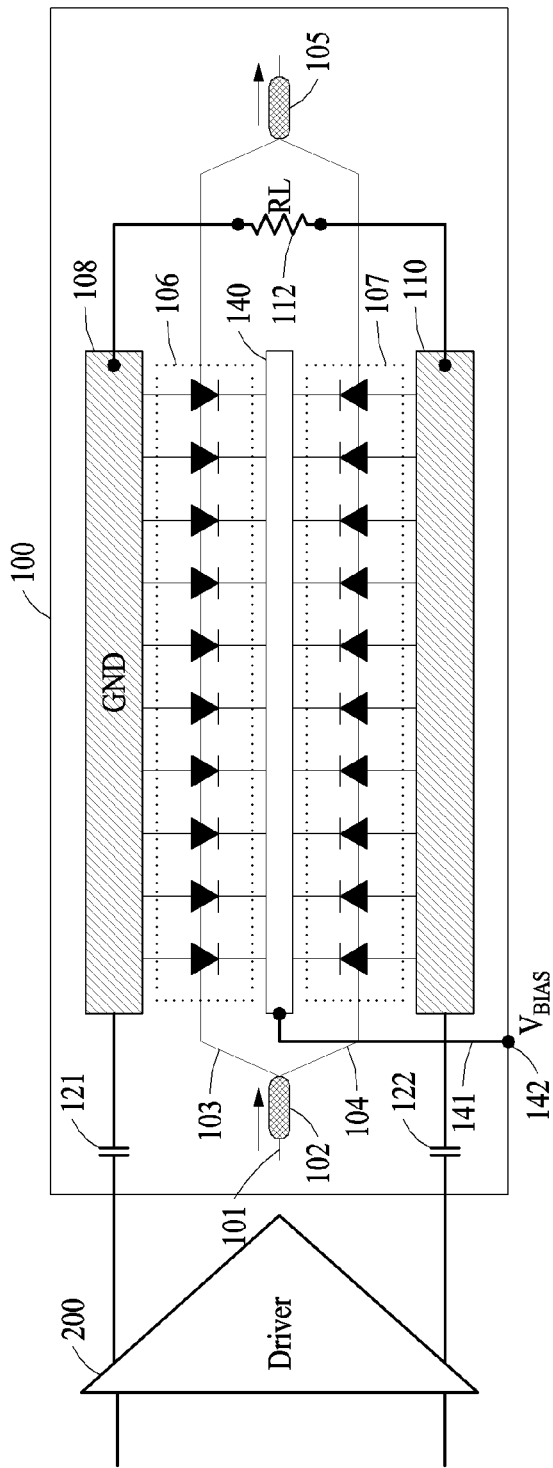
FIG. 6 is a diagram illustrating an example of a silicon photonics-based optical modulator according to an example embodiment.

FIG. 6 is a diagram illustrating an example of a silicon photonics-based optical modulator according to an example embodiment.

Referring to FIG. 6, the optical modulator 100 may have a small capacitor 122 or a small capacitor 123 disposed at an input end of the RF metal electrode 108 or the RF metal electrode 110 for receiving an alternating current (AC)-coupled RF electrical signal.

Example embodiments illustrated in FIGS. 1 through 5 connect a small capacitor 115 to a ground for eliminating an inductance effect of a metal wire of the RL 112 and the RL 113 of the optical modulator 100 or the power supply 130.

However, as illustrated in FIG. 6, the small capacitor 122 or the small capacitor 123 for AC coupling an input end of the RF metal electrode 108 or the RF metal electrode 110 may be disposed on the input end of the RF metal electrode 108 or the RF metal electrode 110, respectively.

A very short RF interface may be needed between the driving driver 200 and the optical modulator 100, and thus the small capacitor 122 or the small capacitor 123 described herein may be used for AC coupling and an RF loss may still be minimized.

When the optical modulator 100 operates in a series-push-pull structure as illustrated in FIG. 6, the optical modulator 100 may have a DC voltage applied to the bias metal electrode 140 through the inductive line 141 connected to the bias power source $V_{BIAS}$ 142. Here, the bias metal electrode 140 may be independent of the RF metal electrode 108 or the RF metal electrode 110. Thus, an overall RF response characteristic of the optical modulator 100 may not be affected even when the bias metal electrode 140 is inductive or resistive.

The optical modulator 100 illustrated in FIG. 6 may be provided such that the RF metal electrode 108 and the RF metal electrode 110 are connected to each other through the RL 112, and thus an impedance matching may be performed with a characteristic impedance of the optical modulator 100.

Unlike other example embodiments, the example embodiment illustrated in FIG. 6 may be a structure that is not provided with a DC power supply at a termination end and may use a type of a driver that operates without a DC power supply at an end of an optical modulator.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A silicon photonics-based optical modulator comprising:
   first radio frequency (RF) metal electrodes that operate as grounds;
   phase shifters disposed between the first RF metal electrodes and optically modulating optical signals transmitted along optical waveguides;
   second RF metal electrodes disposed between the phase shifters, receiving RF electrical signals through one ends thereof from a driving driver located outside of the optical modulator, and providing the RF electrical signals to the phase shifters;
   resistor-inductors (RLs) connected at one ends thereof to other ends of the second RF metal electrodes;
   an inductive line disposed between a junction point of other ends of the RLs and a power supply for applying a bias voltage to the optical modulator and the driving driver; and
   a silicon capacitor disposed between the junction point of the other ends of the RLs and the power supply and preventing a degradation of an RF response characteristic of the optical modulator caused by the inductive line.

2. The silicon photonics-based optical modulator of claim 1, wherein the silicon capacitor is disposed on a trench region formed on a substrate forming the optical modulator, wherein a size of the trench region is determined based on a size of the silicon capacitor.

3. The silicon photonics-based optical modulator of claim 2, wherein a depth of the trench region is determined such that a height of the RF metal electrodes formed on the substrate forming the optical modulator corresponds to a height of a pad of the silicon capacitor.

4. The silicon photonics-based optical modulator of claim 1, wherein the silicon capacitor that is separately manufactured is connected to a substrate forming the optical modulator through a wire bonding or a bump bonding.

5. The silicon photonics-based optical modulator of claim 1, wherein the silicon capacitor is connected to a substrate forming the optical modulator after being disposed on a separate submount.

6. The silicon photonics-based optical modulator of claim 1, wherein the silicon capacitor is integrated into a single chip having undergone a same complementary metal-oxide-semiconductor (CMOS) process as the optical modulator.

7. The silicon photonics-based optical modulator of claim 1, further comprising:
   additional inductive lines disposed between one ends of the first RF metal electrodes and bias power supplies, when the first RF metal electrodes do not operate as the grounds and the bias power supplies apply bias voltages to each of the phase shifters; and
   silicon capacitors disposed between the first RF metal electrodes and the bias power supplies and preventing a degradation of an RF response characteristic caused by the additional inductive lines of the optical modulator.

8. A silicon photonics-based optical modulator comprising:
   radio frequency (RF) metal electrodes that operate as grounds;
   phase shifters disposed between the RF metal electrodes and optically modulating optical signals transmitted along optical waveguides;
   a bias metal electrode disposed between the phase shifters and receiving a first bias voltage through one end thereof from a bias power source located outside of the optical modulator;
   resistor-inductors (RLs) connected at one ends thereof to one ends of the RF metal electrodes;
   an inductive line disposed between a junction point of other ends of the RLs and a power supply for applying a second bias voltage to the optical modulator and a driving driver; and
   a silicon capacitor disposed between the junction point of the other ends of the RLs and the power supply and preventing a degradation of an RF response characteristic of the optical modulator caused by the inductive line.

9. The silicon photonics-based optical modulator of claim 8, wherein the silicon capacitor is disposed on a trench region formed on a substrate forming the optical modulator, wherein a size of the trench region is determined based on a size of the silicon capacitor.

10. The silicon photonics-based optical modulator of claim 9, wherein a depth of the trench region is determined such that a height of the RF metal electrodes formed on the substrate forming the optical modulator corresponds to a height of a pad of the silicon capacitor.

11. The silicon photonics-based optical modulator of claim 8, wherein the silicon capacitor that is separately manufactured is connected to a substrate forming the optical modulator through a wire bonding or a bump bonding.

12. The silicon photonics-based optical modulator of claim 8, wherein the silicon capacitor is connected to a substrate forming the optical modulator after being disposed on a separate submount.

13. The silicon photonics-based optical modulator of claim 8, wherein the silicon capacitor is integrated into a single chip having undergone a same complementary metal-oxide-semiconductor (CMOS) process as the optical modulator.

14. The silicon photonics-based optical modulator of claim 8, wherein the phase shifters are connected in series through the bias metal electrode and operate in a series-push-pull structure.

15. A silicon photonics-based optical modulator comprising:
   radio frequency (RF) metal electrodes for receiving RF electrical signals from a driving driver located outside of the optical modulator;
   phase shifters disposed between the RF metal electrodes for and optically modulating optical signals transmitted along optical waveguides;
   a bias metal electrode for receiving a bias voltage through one end thereof from a bias power source located outside of the optical modulator;
   a resistor-inductor (RL) connecting one ends of the RF metal electrodes to each other; and
   silicon capacitors disposed in front of the RF metal electrodes to perform alternating current (AC) coupling on the RF electrical signals received from the driving driver.

16. The silicon photonics-based optical modulator of claim 15, wherein the silicon capacitor is disposed on a trench region formed on a substrate forming the optical modulator, wherein a size of the trench region is determined based on a size of the silicon capacitor.

17. The silicon photonics-based optical modulator of claim 16, wherein a depth of the trench region is determined such that a height of the RF metal electrodes formed on the substrate forming the optical modulator corresponds to a height of a pad of the silicon capacitor.

18. The silicon photonics-based optical modulator of claim 15, wherein the silicon capacitor that is separately manufactured is connected to a substrate forming the optical modulator through a wire bonding or a bump bonding.

19. The silicon photonics-based optical modulator of claim 15, wherein the silicon capacitor is connected to a substrate forming the optical modulator after being disposed on a separate submount.

20. The silicon photonics-based optical modulator of claim 15, wherein the phase shifters are connected in series through the bias metal electrode and operate in a series-push-pull structure.

* * * * *